(12) United States Patent
Francini

(10) Patent No.: US 8,842,540 B2
(45) Date of Patent: Sep. 23, 2014

(54) SYSTEM AND METHOD FOR IMPLEMENTING ACTIVE QUEUE MANAGEMENT ENHANCEMENTS FOR VARIABLE BOTTLENECK RATES

(71) Applicant: Andrea Francini, Mooresville, NC (US)

(72) Inventor: Andrea Francini, Mooresville, NC (US)

(73) Assignee: Alcatel Lucent, Boulogne-Billancourt (FR)

( * ) Notice: Subject to any disclaimer, the term of this patent is extended or adjusted under 35 U.S.C. 154(b) by 172 days.

(21) Appl. No.: 13/629,731

(22) Filed: Sep. 28, 2012

(65) Prior Publication Data
US 2013/0308456 A1  Nov. 21, 2013

Related U.S. Application Data

(60) Provisional application No. 61/648,863, filed on May 18, 2012.

(51) Int. Cl.
*H04L 12/26* (2006.01)

(52) U.S. Cl.
USPC ........................................................ 370/235

(58) Field of Classification Search
None
See application file for complete search history.

(56) References Cited

U.S. PATENT DOCUMENTS

| 7,324,535 | B1 | 1/2008 | Goss et al. | |
|---|---|---|---|---|
| 2002/0126710 | A1* | 9/2002 | Bergenwall et al. | 370/535 |
| 2002/0188648 | A1 | 12/2002 | Aweya et al. | |
| 2003/0007456 | A1* | 1/2003 | Gupta et al. | 370/232 |
| 2003/0112814 | A1* | 6/2003 | Modali et al. | 370/412 |
| 2003/0231646 | A1* | 12/2003 | Chandra et al. | 370/412 |
| 2004/0117791 | A1* | 6/2004 | Prasad et al. | 718/100 |
| 2005/0135355 | A1* | 6/2005 | Muthukrishnan et al. | 370/389 |
| 2012/0092996 | A1* | 4/2012 | Lautenschlaeger | 370/235 |

OTHER PUBLICATIONS

K. Nichols et al., "Controlling Queue Delay", Networks, vol. 10, Issue 5, May 2012, pp. 1-15.
S. Blake et al., "An Architecture for Differentiated Services", IETF RFC 2475, Dec. 1998, pp. 1-36.
S. Floyd et al., "Random Early Detection Gateways for Congestion Avoidance", IEEE/ACM Transactions on Networking, 1(4):1993, pp. 1-22.
Y. Zheng et al., "Performance evaluation of adaptive AQM algorithms in a variable bandwidth network", IEICE Transactions on Communications, vol. E86-B, No. 6, Jun. 2003, pp. 2060-2067.
J. Zhou et al., "Modeling the effects of variable bandwidth on TCP throughput", ICCCN 2009, San Francisco, CA, Aug. 2009, 7 pgs.
A. Baiocchi et al., "TCP fluid modeling with a variable capacity bottleneck link", IEEE INFOCOM 2007, Anchorage, AK, May 2007, pp. 1046-1054.
A. Francini, "Beyond RED: Periodic early detection for on-chip buffer memories in network elements", Proceedings of IEEE HPSR 2011, Cartagena, Spain, Jul. 2011, pp. 132-139.

(Continued)

*Primary Examiner* — Otis L Thompson, Jr.
(74) *Attorney, Agent, or Firm* — M. J. Hodulik

(57) ABSTRACT

An advance is made over the prior art in accordance with the principles of the present invention that is directed to a new approach for a system and method for a buffer management scheme. Certain embodiments of the invention improve the response of AQM schemes with controllable parameters to variations of the output rate of the bottleneck buffer. The impact on TCP performance can be substantial in most cases where the bottleneck rate is not guaranteed to be fixed. The new solution allows AQM schemes to achieve queue stability despite continuous variations of the bottleneck rate.

15 Claims, 12 Drawing Sheets

(56) References Cited

OTHER PUBLICATIONS

S. Floyd et al., "Adaptive RED: An Algorithm for Increasing the Robustness of RED's Active Queue Management", Aug. 2001, http://icir.org/floyd/papers/adaptiveRed.pdf, pp. 1-12.

IEEE 802.1Q-2011, http://www.ieee802.org/1/pages/802.1Q-2011.html, Aug. 31, 2011, 1365 pgs.

A. Francini, U.S. Appl. No. 13/006,142, filed Jan. 13, 2011, "Single Early Discard for Reduced Delay in Network Buffers", 45 pages.

S. Nedevschi et al., "Reducing Network Energy Consumption via Sleeping and Rate-Adaptation", USENIX, NSDI 2008, San Francisco, CA, Apr. 2008, pp. 323-336.

A. Francini et al., "Performance Bounds of Rate-Adaptation Schemes for Energy-Efficient Routers", IEEE HPSR 2010, Dallas, TX, Jun. 2010, pp. 175-182.

S. Antonakopoulos et al., "Power-Aware Routing with Rate-adaptive Network Elements", IEEE GreenComm3, Miami, FL, Dec. 2010, pp. 1428-1432.

H. Jiang et al., "Why is the Internet Traffic Bursty in Short Time Scales?", ACM SIGMETRICS 2005, Basnff, Canada, Jun. 2005, pp. 241-252.

W. Feng et al., "A Self-Configuring Red Gateway", IEEE INFOCOM 1999, New York, NY, Mar. 1999, pp. 1-18.

G. Appenzeller et al., "Sizing Router Buffers", ACM SIGCOMM 2004, Portland, OR, Aug. 2004, pp. 281-292.

B. Braden et al., "Recommendations on Queue Management and Congestion Avoidance in the Internet", IETF RFC 2309, Apr. 1998, pp. 1-17.

F. Ren et al., "Modeling and Improving TCP Performance over Cellular Link with Variable Bandwidth", IEEE Transactions on Mobile Computing, 10(8), Aug. 2011, pp. 1057-1070.

S. Floyd et al., "The NewReno Modification to TCP's Fast Recovery Algorithm", IETF RFC 3782, Apr. 2004, pp. 1-19.

S. Ha et al., "Cubic: A New TCP-Friendly High-Speed TCP Variant", ACM SIGOPS Op. Sys Review, 42(5), Jul. 2008, pp. 64-74.

C. Villamizar et al., "High Performance TCP in ANSNET", ACM SIGCOMM Computer Communication Review, 24 (5), Oct. 1994, pp. 45-60.

Ns2. <http://nsnam.isi.edu/nsnam/index.php/Main_Page>. 2 pages.

PCT International Search Report dated Aug. 14, 2013 (PCTUS2013/041513) 3 pages.

\* cited by examiner

FIG. 6 if $(\bar{q} < b_{min}^{PED})$ then $\quad \alpha = \bar{q}/b_{min}^{PED}$ $\quad T_D = \min\{T_D^{(N)}, T_D \cdot (2-\alpha)\}$ else if $(\bar{q} \; b_{min}^{PED})$ then $\quad \alpha = b_{min}^{PED}/\bar{q}$ $\quad T_D = \max\{T_D^{(I)}, T_D \cdot (1+\alpha)/2\}$

SYSTEM AND METHOD FOR IMPLEMENTING ACTIVE QUEUE MANAGEMENT ENHANCEMENTS FOR VARIABLE BOTTLENECK RATES

RELATED APPLICATIONS

The invention claims the benefit of U.S. Provisional Application Ser. No. 61/648,863, filed May 18, 2012.

TECHNICAL FIELD

This invention relates generally to communications systems and more particularly to memory allocation for packet buffers of network elements in IP networks.

BACKGROUND OF THE INVENTION

Many Active Queue Management (AQM) schemes have been proposed in the last 20 years since Random Early Detection (RED) was first presented in S. Floyd and V. Jacobson, "Random early detection gateways for congestion avoidance," IEEE/ACM Transactions on Networking, 1(4):397-413, 1993. As opposed to the conventional tail-drop policy, which drops an incoming packet only if the packet finds the queue fully loaded, AQM schemes start dropping packets when the queue is still far from filling up. By proper spacing of the early packet drop decisions, AQM balances the amount of packets that are removed from the data path because of the reduced activity of the TCP sources that experience the packet losses with the amount of packets that all the other sources keep adding to the data path.

The performance of AQM schemes has been studied extensively, but almost exclusively under steady bottleneck rates. Since standard frameworks for Quality of Service, see for example, S. Blake et al., "An architecture for differentiated services," IETF RFC 2475, December 1998, and IEEE 802.1Q <http://www.ieee802.org/1/pages/802.1Q-2011.html>, typically assign lower scheduling priority to TCP versus other types of traffic, in practice the output rate of the TCP buffer is continuously modulated by the arrival rate of higher-priority traffic. The rather negative effects of bottleneck rate variations on the link utilization performance of buffer management schemes are documented in Y. Zheng, M. Lu, and Z. Feng, "Performance evaluation of adaptive AQM algorithms in a variable bandwidth network," IEICE Transactions on Communications E86-B(6):2060-2067, June 2003 and J. Zhou, F. Ren, and C. Lin, "Modeling the effects of variable bandwidth on TCP throughput," ICCCN 2009, San Francisco, Calif., August 2009. In addition, the results presented in A. Baiocchi and F. Vacirca, "TCP fluid modeling with a variable capacity bottleneck link," IEEE INFOCOM 2007, Anchorage, Ak., May 2007, indicate that those effects are mostly controlled by the relationship between the round-trip time (RTT) of the TCP connections and the fundamental time constant of the bottleneck rate function (BRF), which represents the evolution of the bottleneck rate over time. There is very little that an AQM scheme can do to prevent the TCP buffer from overflowing when the amplitude of the bottleneck rate variations is large compared to the size of the buffer. However, an effective AQM scheme can help prepare the TCP connections for a faster throughput recovery, so that the long-term consequences of the buffer overflow events are much milder.

What is desired are methods for improving the response of AQM schemes to bottleneck rate variations, so that the negative impact of those variations on TCP throughput is minimized.

SUMMARY

An advance is made over the prior art in accordance with the principles of the present invention that is directed to a new approach for a system and method for a buffer management scheme. Certain embodiments of the invention improve the response of AQM schemes with controllable parameters to variations of the output rate of the bottleneck buffer. The impact on TCP performance can be substantial in most cases where the bottleneck rate is not guaranteed to be fixed. The new solution allows AQM schemes to achieve queue stability despite continuous variations of the bottleneck rate.

In one embodiment of the invention, a method of operating a packet buffer in a communications network is set forth, wherein the packet buffer is operable to accept multiple flows of packets. A method of operating a packet buffer is included, the packet buffer operable to accept multiple flows of packets, wherein an average queue length (AQL) value of said packet buffer is calculated, said method comprising:

comparing the AQL with a first threshold, wherein a packet drop rate remains unchanged as long as the AQL is less than the first threshold;

tracking a first timer representative of a time since a latest buffer overflow event, a second timer representative of a time since the buffer was last empty, and a third timer representative of a time since a packet loss was last triggered by an active queue management (AQM) decision; and updating the packet drop rate if said AQL is greater than said first threshold and comparison with said first timer indicates that within a given time no buffer overflow has occurred, and comparison with said second timer indicates that within a given time the buffer has not been empty or comparison with said third timer indicates that within a given time there has been at least one packet loss triggered by said AQM decision.

In some embodiments, wherein an instantaneous queue length (IQL) value of said buffer is calculated, said method of operating a packet buffer further includes:

comparing the IQL with a second threshold; and triggering packet losses when the IQL is greater than said second threshold, at time intervals whose duration depends on a distance between said IQL and said second threshold.

In some embodiments the larger the distance between said IQL and said second threshold, the shorter the time interval.

In some embodiments an AQM scheme updates parameters that control packet drop decisions at time intervals that depend on the distance between the AQL and said second threshold when the AQL is greater than said second threshold.

In some embodiments the larger the distance between the AQL and said second threshold, the more frequent the updates.

In some embodiments the updates are less frequent than extra packet losses controlled by the IQL, but more frequent than the updates of drop-decision parameters triggered by the AQM scheme when the AQL is between a third threshold and said second threshold, wherein said third threshold is an AQL threshold, not larger than said second threshold, above which the AQM scheme can ordinarily update parameters that control packet drop decisions.

In some embodiments a drop period is reduced by a given amount when the buffer overflows.

In some embodiments a drop period timer that controls a periodic update of a packet drop period is checked when said buffer overflows, wherein if said drop period timer has expired, said drop period is reduced by said given amount.

In some embodiments said given amount is one half.

Another embodiment includes a method of operating a packet buffer, the packet buffer operable to accept multiple flows of packets, wherein an average queue length (AQL) value of said packet buffer is calculated, said packet buffer including an active queue management (AQM) scheme that includes a drop period, expiration of which triggers a sampling of said AQL, said method comprising:

providing a first timer, $\tau_u$, that is reset when a packet drop period is updated; a second timer, $\tau_o$, that is reset when the buffer overflows, a third timer, $\tau_e$, that is disabled when the buffer becomes empty and reset when the buffer leaves the empty state and a fourth timer, $\tau_d$, that is reset when the AQM scheme drops a packet;

upon expiration of a fifth timer $\tau_q$, calculating a new AQL value and comparing said new AQL value to a first threshold, wherein if the AQL exceeds said first threshold, a check is performed to determine if said timer $\tau_u$ and said timer $\tau_o$ are expired and said timer $\tau_e$ is not disabled and the timer $\tau_e$ has expired; and updating the packet drop period if said new AQL value is greater than said first threshold and said second and third or second and fourth timers are expired.

Another embodiment includes a method of operating a packet buffer, the packet buffer operable to accept multiple flows of packets, wherein an average queue length (AQL) value of said packet buffer is calculated, and wherein an instantaneous queue length (IQL) value of said buffer is calculated, said method comprising:

increasing the frequency of packet drop decisions without lowering the drop period when the IQL approaches buffer saturation levels.

In some embodiments when the IQL exceeds a safety threshold, dropping a next packet if a packet drop has not occurred within a given IQL suspension time.

In some embodiments further including lowering a drop period when the AQL exceeds a safety threshold, if a given suspension time has elapsed since a latest drop period update.

In some embodiments a timer $\tau_s^{IQL}$ is reset upon a packet drop decision and expires after a time $T_S^{IQL} = \tau_D \exp\{[(q - b_{safe}^{PED})/(Q_{max} - b_{safe}^{PED})] \ln(\tau_D^{(l)}/\tau_D)\}$.

In some embodiments a timer $\tau_s^{AQL}$ is reset when a time a timer $\tau_p$ that controls periodic updates of a packet drop period expires or when the packet drop period is updated, said timer $\tau_s^{AQL}$ expiring after a time $T_S^{AQL} = \tau_D \exp\{[(\bar{q} - b_{safe}^{PED})/(Q_{max} - b_{safe}^{PED})] \ln(\tau_D^{(l)}/\tau_D)\}$.

In some embodiments that include said timer $\tau_s^{IQL}$, including a timer $\tau_q$ for updating the AQL, wherein when said timer $\tau_q$ expires it is checked if $q > b_{safe}^{PED}$ AND the timer $\tau_s^{IQL}$ has expired, wherein if so, a next incoming packet is dropped.

Another embodiment includes a communications device having memory, said memory having stored therein a plurality of instructions, said device further including a packet buffer, the packet buffer operable to accept multiple flows of packets, wherein an average queue length (AQL) value of said packet buffer is calculated, wherein the plurality of instructions, when executed by a processor, cause the processor to perform the steps of:

comparing the AQL with a first threshold, wherein a packet drop rate remains unchanged as long as the AQL is less than the first threshold;

tracking a first timer representative of a time since a latest buffer overflow event, a second timer representative of a time since the buffer was last empty, and a third timer representative of a time since a packet loss was last triggered by an active queue management (AQM) decision; and updating the packet drop rate if said AQL is greater than said first threshold and comparison with said first timer indicates that within a given time no buffer overflow has occurred, and comparison with said second timer indicates that within a given time the buffer has not been empty or comparison with said third timer indicates that within a given time there has been at least one packet loss triggered by said AQM decision.

In some embodiments an instantaneous queue length (IQL) value of said buffer is calculated, further including:

comparing the IQL with a second threshold; and triggering packet losses when the IQL is greater than said second threshold, at time intervals whose duration depends on a distance between said IQL and said second threshold.

In some embodiments the larger the distance between said IQL and said second threshold, the shorter the time interval.

In some embodiments an AQM scheme updates parameters that control packet drop decisions at time intervals that depend on the distance between the AQL and said second threshold when the AQL is greater than said second threshold.

In some embodiments the larger the distance between the AQL and said second threshold, the more frequent the updates.

Another embodiment includes a communications device having memory, said memory having stored therein a plurality of instructions, said device further including a packet buffer, the packet buffer operable to accept multiple flows of packets, wherein an average queue length (AQL) value of said packet buffer is calculated, and wherein an instantaneous queue length (IQL) value of said buffer is calculated, wherein the plurality of instructions, when executed by a processor, cause the processor to perform the steps of:

increasing the frequency of packet drop decisions without lowering the drop period when the IQL approaches buffer saturation levels; and wherein when the IQL exceeds a safety threshold, dropping a next packet if a packet drop has not occurred within a given IQL suspension time.

In some embodiments further including lowering a drop period when the AQL exceeds a safety threshold, if a given suspension time has elapsed since a latest drop period update.

In some embodiments further including a check if $q > b_{safe}^{PED}$ AND the timer $\tau_s^{AQL}$ has expired, wherein if so the packet drop period is decreased.

BRIEF DESCRIPTION OF THE DRAWING

The teachings of the present invention can be readily understood by considering the following detailed description in conjunction with the accompanying drawings, in which:

FIG. 6 shows exemplary Pseudo-code for a drop period update in accordance with the exemplary embodiments;

DETAILED DESCRIPTION

Exemplary embodiments of the invention will now be described while referring to the figures, several of which may be simultaneously referred to during the course of the following description. Before describing the present invention, however, we will continue with some discussion of the prior art as it relates to aspects of the present invention.

The RED active queue management scheme that was mentioned in the background section has intrinsically good dynamic properties because it adjusts the packet drop rate instantly as the average queue length (AQL) keeps trailing the instantaneous queue length (IQL). However, RED suffers from the general problem that there is not a single choice of configuration parameters that makes it work well with all possible traffic configurations. Given a set of values for the configuration parameters, a RED queue will perform well at steady state and with variable bottleneck rate only if the traffic mix is compatible with the parameters. The inability of RED to work well with a large set of traffic scenarios is the very reason why the data networking community keeps devising new AQM schemes.

Figure 1:
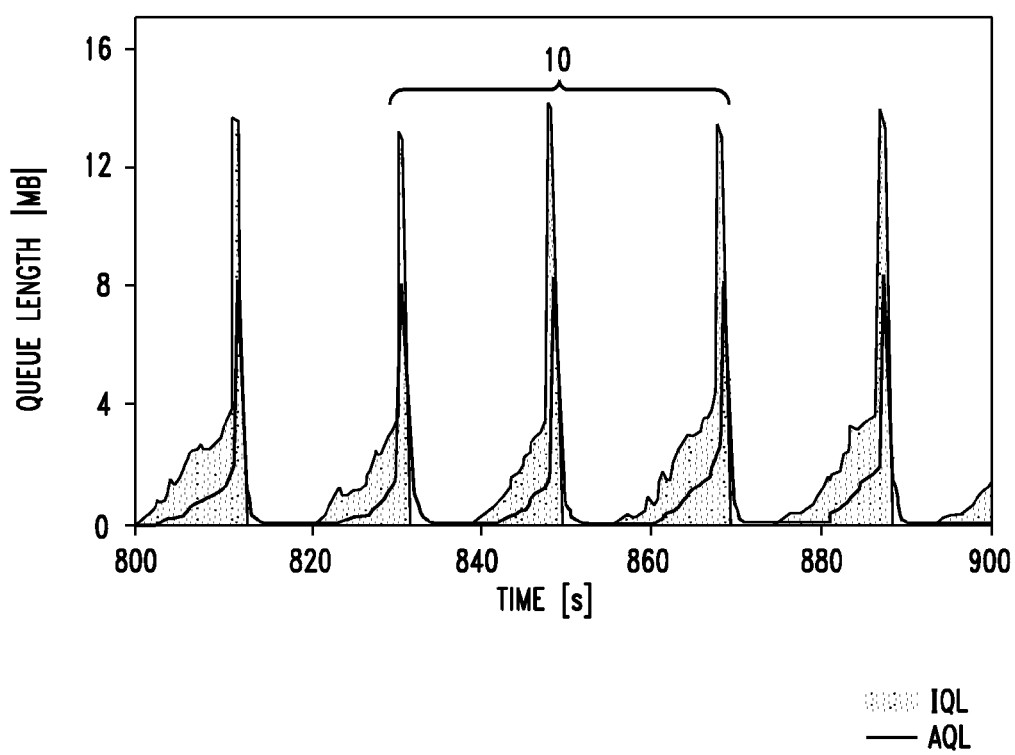
FIGS. 1, 2, 3, 4 and 5 show exemplary plots for average and instantaneous queue length under different scenarios described for each figure

The Adaptive RED (ARED) scheme described in S. Floyd, R. Gummadi, and S. Shenker, "Adaptive RED: An algorithm for increasing the robustness of RED's active queue management," August 2001, http://icir.org/floyd/papers/adaptiveRed.pdf, tries to address the limitations of RED by adding a control mechanism that dynamically adjusts the maximum drop probability (one of RED's parameters) to the AQL. If the AQL grows too large, ARED increases the maximum drop probability to lower the AQL. If the AQL is too low, ARED decreases the maximum drop probability to increase the AQL. The updates of maximum drop probability occur at fixed time intervals, typically large enough to include the round-trip times (RTT's) of most TCP connections in the traffic mix. Unfortunately, as originally defined the control loop that regulates the maximum drop probability ends up locking systematically the maximum drop probability onto its minimum allowed value. As a consequence, ARED performs exactly the same way as RED with the maximum drop probability set equal to the minimum value that ARED allows for the parameter. FIG. 1 shows an example of evolution of the IQL and AQL when the minimum value allowed by ARED for the maximum drop probability is too high for the traffic mix of the experiment. As shown, a number of queue length oscillations 10 occur as represented by the continuous peaks and valleys registered by the AQL and IQL variables. Queue length oscillations that include extended time intervals with no packets in the queue indicate instability due to incompatibility of the ARED parameters with the traffic mix.

Figure 2:
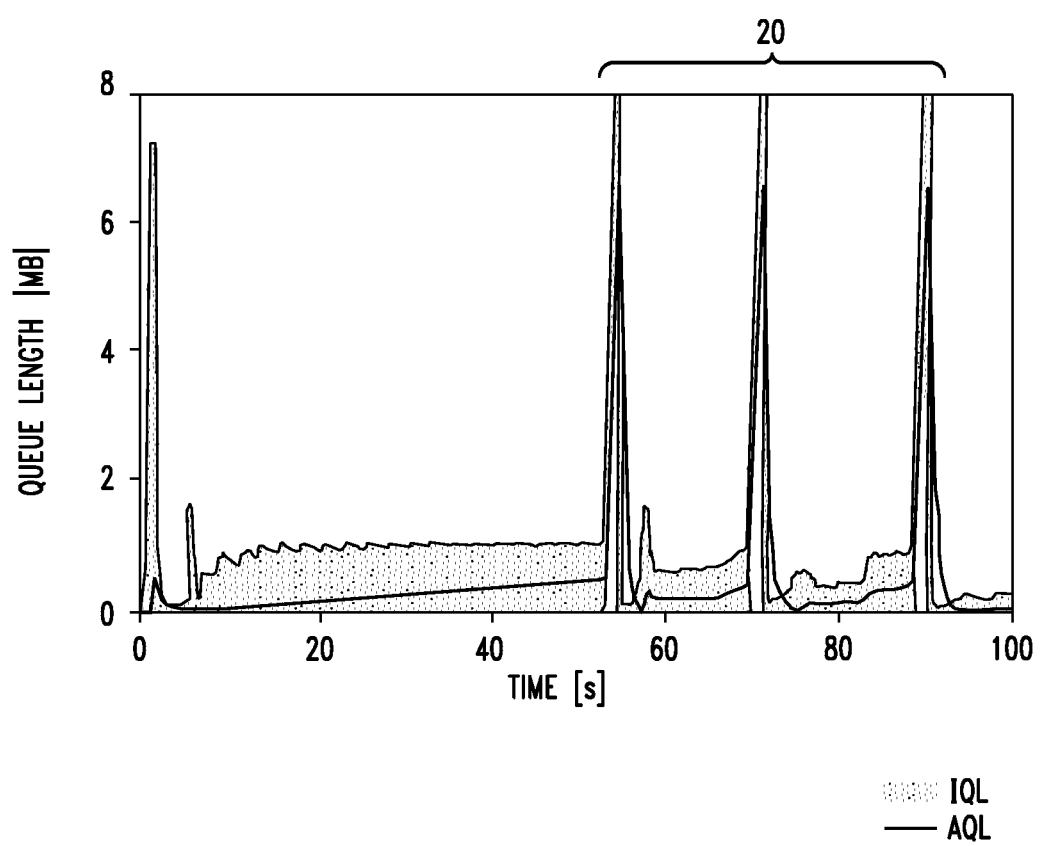
Figure 3:
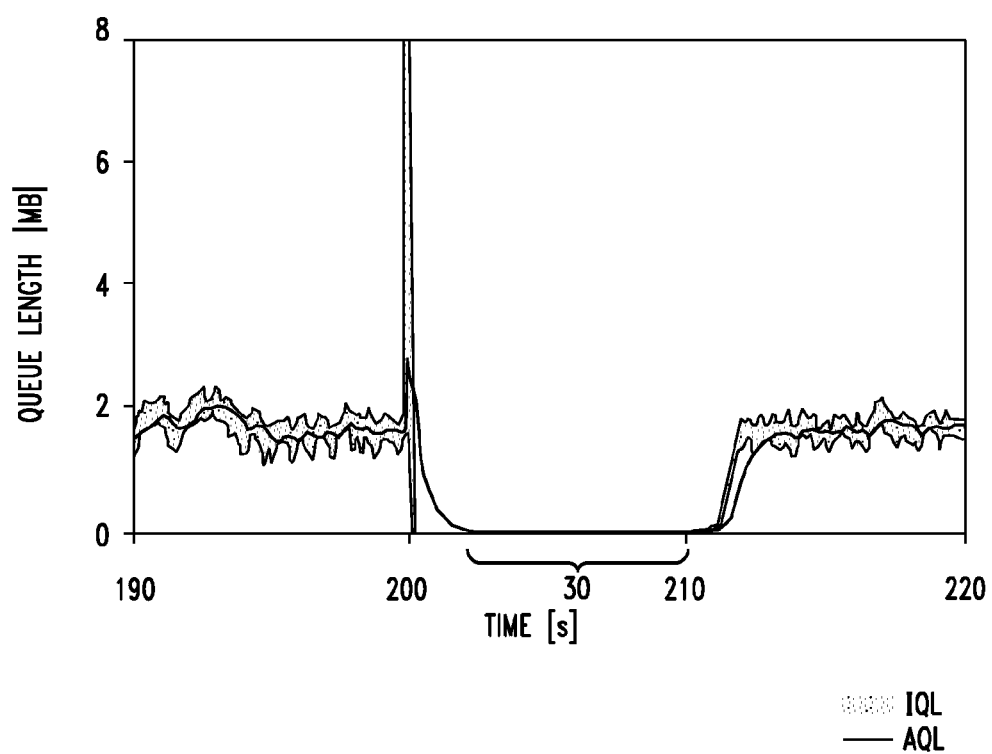

The Periodic Early Detection (PED) scheme set forth in A. Francini, "Beyond RED: Periodic early detection for on-chip buffer memories in network elements," Proceedings of IEEE HPSR 2011, Cartagena, Spain, July 2011 and described in U.S. patent application Ser. No. 13/006142, entitled System And Method For Implementing Periodic Early Discard In On-Chip Buffer Memories Of Network Elements, filed on Jan. 13, 2011, both of which references are incorporated herein by reference, uses a fixed packet drop rate (instead of one that changes instantly with the AQL, as in RED and ARED) for extended periods of time. At fixed time intervals of duration T, sized with similar criteria as those utilized by ARED for control of the maximum drop probability, PED looks at the AQL to assess the success of the current packet drop rate at keeping the queue length balanced. If the AQL is smaller than a threshold $b_{min}^{PED}$, PED reduces the packet drop rate. If the AQL is larger than a threshold $b_{max}^{PED} > b_{min}^{PED}$, PED increases the packet drop rate. PED leaves the packet drop rate unchanged if the AQL is in between the two thresholds. PED exhibits excellent steady-state performance. Once the configuration parameters are adjusted to the maximum output rate $C_{max}$, they work well with any traffic mix with steady bottleneck rate. This is the most important practical benefit of PED over RED. However, as originally specified, PED may be slow at moving the packet drop rate into the range that restores the queue in equilibrium after a change of bottleneck rate. The delay in finding the equilibrium rate translates into losses of link utilization that in adverse circumstances may be disadvantageous. FIG. 2 shows a first example of the consequences of PED s inability to move the packet drop rate quickly into the desired range: the buffer overflows before PED can effectively take control of the queue length. That is, FIG. 2 shows a number of queue oscillations 20 when PED fails to find the right value of a packet drop rate before the buffer overflows. This behavior is similar to that exhibited by ARED when it locks on the minimum value allowed for the maximum drop probability. FIG. 3 shows a second example of the negative impact of a slow response to a temporary change in the bottleneck rate: it takes more than 10 seconds to restore full utilization of the bottleneck link after the disruptive event, which translates into a long-term loss of TCP throughput. More specifically, FIG. 3 illustrates a delay 30 by PED in restoring full utilization of the bottleneck link after a short-lived drop of bottleneck rate.

Embodiments of the present invention disclose methods for improving the AQM response to bottleneck rate variations. The focus is specifically on AQM schemes, such as but not limited to Adaptive RED and Periodic Early Detection, which resort to an inline control mechanism for periodically adjusting the parameters that drive the packet drop decisions. In the specific case of Adaptive RED, some embodiments of the invention improve the control of the maximum drop probability, so that ARED does not get locked onto the minimum value allowed. In the specific case of PED, embodiments of the invention improve the control of the packet drop rate, so that it quickly reaches the value range that keeps the queue in equilibrium. In all cases embodiments of the invention affect the setting of the time between consecutive packet drop decisions by the AQM scheme, shortly referred to as the packet drop period.

In one embodiment of the invention, a method is provided for not decreasing the frequency of packet drop decisions when the queue length is found to be small for reasons that are not related to the operation of the AQM scheme. Application of the method prevents the frequency of the packet drop decisions from settling on the minimum value allowed before the AQM scheme can actually start dropping packets.

This embodiment relies on a means or methodology to detect low-occupancy conditions in the queue that are not the result of excessive packet losses triggered by the AQM scheme. Such means include the comparison of the AQL with a threshold $b_{lock} < b_{min}$ ($b_{min}$ is the AQL buffer threshold below which the AQM scheme may update its parameters to decrease the frequency of packet drop decisions), so that the packet drop frequency does not change as long as the AQL is smaller than $b_{lock}$. The means also include measurements of the time $\tau_o$ since the latest buffer overflow event, of the time $\tau_e$ since the queue was last empty, and of the time $\tau_d$ since a packet loss was last triggered directly by the AQM scheme. When the AQL is larger than $b_{lock}$, the update of the packet drop rate is only allowed if the comparison of the three time measures with respective thresholds indicates that in the recent past no buffer overflow has occurred and the queue has not been empty, or that no buffer overflow has occurred and there has been at least one packet loss triggered directly by the AQM scheme.

A second embodiment of the invention increases the frequency of packet drop decisions when the queue length is rapidly drifting towards saturating and possibly overflowing the available buffer space. Application of the methodology in the second embodiment increases the frequency of early packet drop events before the buffer overflows, helping the TCP sources achieve a faster restoration of full-utilization throughput at the bottleneck link during the time that follows a change of bottleneck rate.

The second embodiment methodology relies on the comparison of the IQL with a threshold $b_{safe} > b_{max}$, where $b_{max}$ is the AQL threshold above which the AQM scheme can ordinarily update the parameters that control the packet drop decisions, so that the frequency of the packet drop decisions increases. As the IQL grows larger than $b_{safe}$, the AQM scheme triggers packet losses at time intervals whose duration depends on the distance between the IQL and $b_{safe}$: the larger the distance, the shorter the time interval between consecutive packet drop decisions. When the AQL also crosses $b_{safe}$, the AQM scheme updates the parameters that control the time separation between consecutive packet drop decisions at time intervals that depend on the distance between the AQL and $b_{safe}$: the larger the distance, the more frequent the updates of the parameters. Such updates are less frequent than the extra packet losses controlled by the IQL, but more frequent than the updates of drop-decision parameters triggered by the AQM scheme when the AQL is between $b_{max}$ and $b_{safe}$.

A third embodiment provides a methodology for updating the parameters that drive the packet drop decisions when a buffer overflows, to the effect of increasing the frequency of the packet drop decisions, and for imposing a maximum frequency on those updates, so that the frequency of the packet drop decisions does not increase indefinitely. Application of the method ensures that the frequency of the packet drop decisions does not remain locked onto a very small value at times when the traffic mix produces fast oscillations of the queue length.

Figure 4:
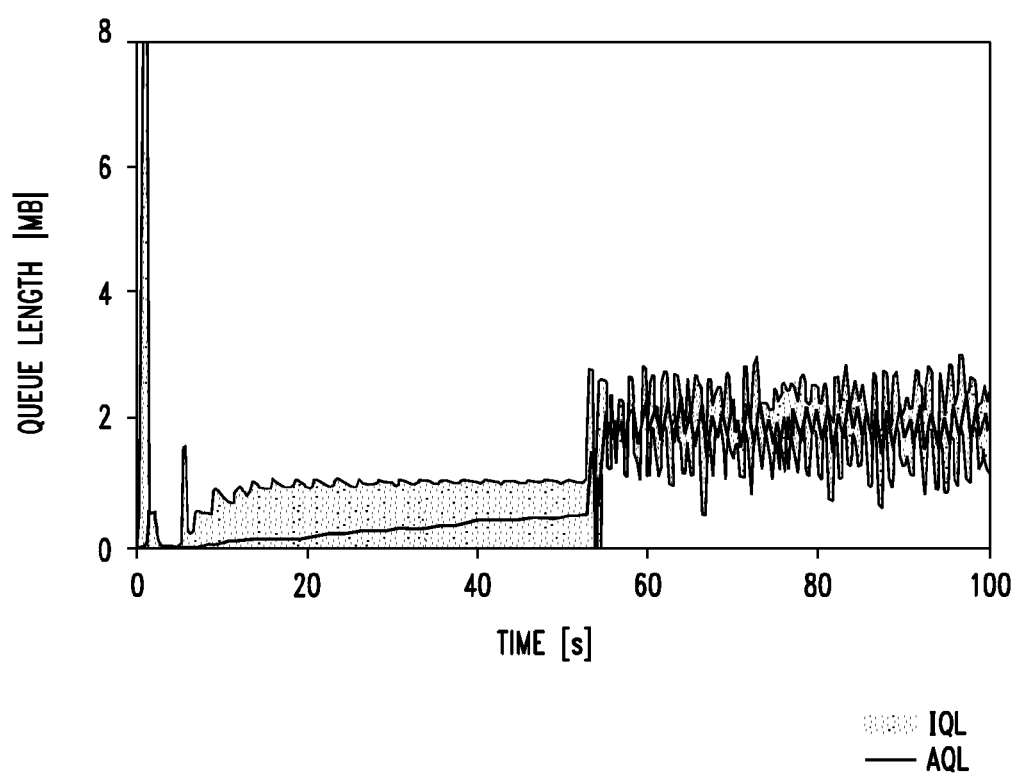

FIG. 4 shows the benefits of the application of the method of the first embodiment to the PED scheme, under the same traffic configuration that produced the plot of FIG. 2.

Figure 5:
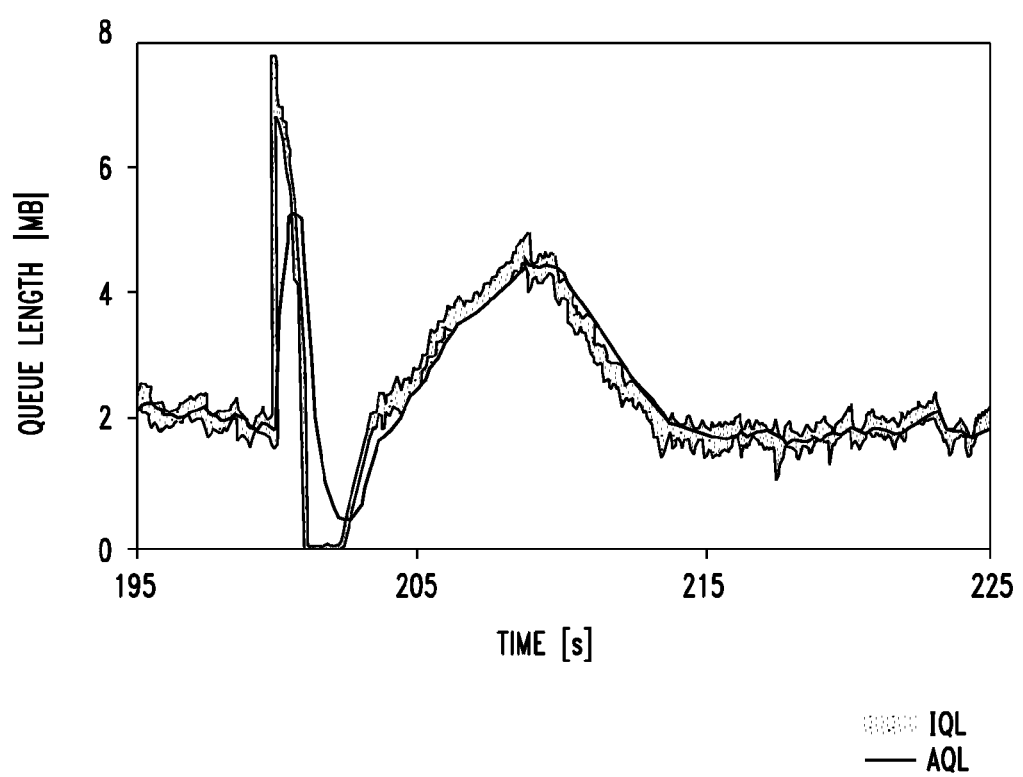

Referring to FIG. 5, application of the second and third embodiment methods of the invention to the PED scheme is shown. As can be seen, more frequent early packet losses when the buffer is about to overflow prepare the TCP sources for a faster throughput restoration after the bottleneck rate settles again.

The following description refers to an embodiment of the methods of the present invention for the Periodic Early Detection (PED) AQM scheme. A summary of the PED scheme precedes the description of the embodiment.

Basic PED Specification

PED combines three synchronous processes that operate at different timescales. First, at the packet timescale PED drops packets at fixed time intervals when signs of congestion are evident. Second, at the round-trip-time (RTT) timescale a control algorithm adjusts the packet drop rate to the evolution of the AQL, which is maintained by the third process.

PED uses a drop timer with period $\tau_D$ to trigger the sampling of the IQL q and AQL $\bar{q}$. Then it compares q and $\bar{q}$ with respective thresholds $b_{min}^{PED}$ and $b_{gate}^{PED} < b_{min}^{PED}$. If $Q > b_{min}^{PED}$ AND $\bar{q} > b_{gate}^{PED}$, PED drops the next incoming packet; otherwise it accepts into the queue the next packet and all the packets that follow, up to the next expiration of the drop period.

At time intervals not shorter than a time constant T that is large enough to include the RTT values of most TCP connections, PED compares $\bar{q}$ with $b_{min}^{PED}$ and with a second threshold $b_{max}^{PED} > b_{min}^{PED}$, increasing $\tau_D$ if $\bar{q} < b_{min}^{PED}$ and decreasing it if $\bar{q} > b_{max}^{PED}$. The size of the period correction is modulated by $\alpha = \bar{q}/b_{min}^{PED}$ for period increases and by $\alpha = b_{max}^{PED}/\bar{q}$ for period decreases. The period $\tau_D$ remains unchanged when the AQL sample lies between the two thresholds. The pseudo-code of FIG. 6 summarizes the update of the drop period after at least a time T has elapsed since the previous update. In the equations, $\tau_D^{(l)}$ is the minimum and also the initial value of the drop period and $\tau_D^{(u)}$ is the maximum value.

Referring to FIG. 6, pseudo-code is shown for an exemplary implementation of a drop period update. The code summarizes the update of the packet drop period after at least a time T has elapsed since the latest drop period update. In the equations of FIG. 6, $\alpha$ is either the ratio between the AQL and the minimum PED threshold (for period increases) or the ratio between the maximum PED threshold and the AQL (for period decreases). The period correction is maximum when $\alpha = 0$.

The period $\tau_q$ of the process that maintains the AQL is larger than the inter-departure time of packets of typical size at the full capacity of the link (e.g., $\tau_q \geq 1500\ B/10\ Gbps = 1.2\ \mu s$), but not larger than a small fraction (e.g., 5%) of the target average delay ($\tau_q \leq 0.05 \cdot 1\ ms = 50\ \mu s$). PED computes $\bar{q}$ as an exponential weighted moving average $\bar{q}[n] = w \cdot q[n] + (1-w) \cdot \bar{q}[n-1]$, where the weight w is the ratio between the averaging period and the PED time constant: $w = \tau_q/T$.

The following is an exemplary list of configuration parameters that drive the operation of PED, inclusive of exemplary recommended settings for a 10 Gbps link: (a) $Q_{max}$ is the total buffer space available; $Q_{max} = 8$ MB keeps the average queueing delay well below 5 ms and enables an on-chip implementation of buffer memories; (b) $b_{gate}^{PED}$ is the gating PED threshold, 10% of $Q_{max}$ ($b_{gate}^{PED} = 0.8$ MB); (c) $b_{min}^{PED}$ is the minimum PED threshold, 20% of $Q_{max}$ ($b_{min}^{PED} = 1.6$ MB); (d) $b_{max}^{PED}$ is the maximum PED threshold, 40% of $Q_{max}$ ($b_{max}^{PED} = 3.2$ MB); (e) $\tau_q$ is the update period for the AQL ($\tau_q = 10\ \mu s$); (f) T is the time between consecutive drop period corrections and coincides with the inverse of the cutoff frequency of the low-pass filter that computes $\bar{q}$; T=500 ms covers most RTT distributions; (g) w is the averaging weight for the AQL ($w = \tau_q/T = 0.00002$); (h) $\tau_D^{(l)}$ is the minimum and initial drop period, slightly larger than $\tau_q$ ($\tau_D^{(l)} = 100\ \mu s$); and (i) $\tau_D^{(u)}$ is the maximum drop period, never larger than T ($\tau_D^{(u)} = 500$ ms).

The values of all parameters depend on the link capacity but not on the number, type, and RTT distribution of the TCP flows that traverse the PED buffer. This is the most tangible practical advantage of PED over RED.

Application to PED for a First Exemplary Embodiment (Suspension of Drop Period Increases)

In traffic configurations with large average RTT it takes a long time for the TCP sources to saturate the link capacity again after a global synchronization event. During the throughput restoration time the AQL remains well below $b_{min}^{PED}$, so that $\tau_D$, increased every time T expires, may easily rise up to its maximum value $\tau_D^{(u)}$. Then, after the AQL crosses $b_{gate}^{PED}$, PED can only drop packets at the lowest rate possible. For the first downward correction of the drop period to happen, PED must wait until the AQL exceeds $B_{max}^{PED}$, which may be too late for preventing the queue from overflowing and starting the same cycle all over again.

PED should simply not increase the drop period if the AQL is low just because of ordinary TCP dynamics. The correction should only occur when it is clear that a short drop period has triggered too many packet losses. A new threshold, for example, $b_{lock}^{PED} = b_{gate}^{PED}/2$ enforces the principle: when $\bar{q} < b_{lock}^{PED}$ the drop period is locked and cannot be updated. Unfortunately, this modification alone creates an opposite risk of queue instability induced by a drop period that is persistently too small. If the AQL grows quickly between $b_{lock}^{PED}$ and $b_{gate}^{PED}$, it gives no time for the drop period to increase before PED starts dropping packets at a very high rate, causing the buffer to deplete quickly. This way the drop period never gets a chance to reach the value that balances the queue, and the link remains under-utilized.

This issue is remedied by allowing more frequent updates of the drop period when the AQL is between $b_{lock}^{PED}$ and $b_{gate}^{PED}$. Instead of waiting for the expiration of T, PED must pace the drop period using a multiple of the period itself ($10\tau_D$ as an example works consistently well): the larger the drop period, the less the drop period needs to be increased. Finally, it is desirable to trigger period increases only at times when there is evidence that the drop period is too small. At a time when $\tau_D$ is eligible for an increase, the AQL may be found between $b_{lock}^{PED}$ and $b_{gate}^{PED}$ shortly after a buffer overflow (the drop period is likely too large), or shortly after a queue visit to the empty state (the TCP sources are still working to restore the link throughput), or a long time after a packet loss triggered directly by PED (the drop period is not responsible for the current placement of the AQL): the enhanced PED according to an embodiment of the invention skips the period increase when it detects any of these conditions by comparing the time elapsed since the latest occurrence of each of the three events with respective thresholds derived from the time constant T.

In the first exemplary embodiment of the invention, PED is implemented with the support of four independent timers: a fast update timer $\tau_u$, an overflow timer $\tau_o$, a latest AQM drop timer $\tau_d$, and an empty buffer timer $\tau_e$. The fast update timer $\tau_u$ is reset every time the period update timer $\tau_p$ expires ($\tau_p$ controls the periodic update of the packet drop period), or when the packet drop period $\tau_D$ is updated; $\tau_u$ expires after a time that is a multiple of the packet drop period, e.g., $10\tau_D$. The overflow timer $\tau_o$ is reset every time the buffer overflows and expires after a time equal to the time constant T. The empty buffer timer $\tau_e$ is disabled when the buffer becomes empty and reset when the buffer leaves the empty state; it expires after a time T/2. The latest AQM drop timer $\tau_d$ is reset every time PED drops a packet (this excludes packet drop events due to buffer overflow) and expires after a time T. When the AQL is updated (upon expiration of the AQL timer $\tau_q$), PED checks if $b_{lock}^{PED}<q<b_{gate}^{PED}$ AND the timer $\tau^u$ has expired AND the timer $\tau_o$ has expired. If yes, a check is done to determine if $q>b_{gate}^{PED}$ AND the timer $\tau_e$ is not disabled AND the timer $\tau_e$ has expired. If yes, the packet drop period is updated using the PED formula for drop period increases. If not, a check is done to determine if the timer $\tau_d$ has expired. If not, the packet drop period is updated using the PED formula for drop period increases, otherwise the drop period is left unchanged. PED also performs the same sequence of operations when the period update timer $\tau_p$ expires.

Application to PED for a Second Exemplary Embodiment (Early Acceleration of Packet Drop Decisions)

It is difficult for an AQM scheme to prevent a buffer from overflowing when the amplitude of the bottleneck rate variation is too large compared to the total buffer space. However, even when the buffer does overflow, there is room for improving the AQM response to the effect of shortening the subsequent throughput recovery time and enabling higher link utilization in the long term. With PED, one way to improve the response to sharp bottleneck rate fluctuations is to increase the frequency of packet drop decisions without lowering the drop period when the IQL rapidly drifts towards saturation levels. While accelerated losses help spread the buffer overflow episode over a longer time, producing less catastrophic global synchronization effects, the drop period should not be modified heavily before the new mix of TCP connections has started settling. When $\overline{q}>b_{gate}^{PED}$ and the IQL exceeds a safety threshold $b_{safe}^{PED}>b_{max}^{PED}$, PED drops the next packet if it has not done so for a suspension time $T_S^{IQL}$ such that $\tau_D^{(l)}<T_S^{IQL}<\tau_D$. $T_S^{IQL}$ should be closer to $\tau_D$ when the IQL is closer to $b_{safe}^{PED}$ and closer to $\tau_D^{(l)}$ when the IQL approaches $Q_{max}$. The following exemplary function serves this purpose well: $T_S^{IQL}=\tau_D \exp\{[(q-b_{safe}^{PED})/(Q_{max}-b_{safe}^{PED})] \ln(\tau_D^{(l)}/\tau_D)\}$. This choice of time between consecutive packet drop decisions aims at establishing a monotonic increasing packet drop rate when the IQL continuously exceeds $b_{safe}^{PED}$.

In the second embodiment, the drop period is also lowered if $\overline{q}>b_{safe}^{PED}$ after a suspension time $T_S^{AQL}=\tau_D \exp\{[(\overline{q}-b_{safe}^{PED})/(Q_{max}-b_{safe}^{PED})] \ln(\tau_D^{(l)}/\tau_D)\}$ has elapsed since the latest period update ($T_S^{AQL} T_S^{IQL}$ because $\overline{q}$ trails q in this particular situation).

The second embodiment is implemented in PED with the support of two added independent timers. A timer $\tau_s^{IQL}$ is reset every time PED drops a packet. It expires after a time $T_S^{IQL}=\tau_D \exp\{[(q-b_{safe}^{PED})/(Q_{max}-b_{safe}^{PED})] \ln(\tau_D^{(l)}/\tau_D)\}$. The timer $\tau_s^{AQL}$ is reset every time the timer $\tau_p$ that controls the periodic update of the packet drop period expires or when the packet drop period is updated; it expires after a time $T_S^{AQL}=\tau_D \exp\{[(\overline{q}-b_{safe}^{PED})/(Q_{max}-b_{safe}^{PED})] \ln(\tau_D^{(l)}/\tau_D)\}$. When the timer $\tau_q$ for updating the AQL expires, PED checks if $q>b_{safe}^{PED}$ AND the timer $\tau_s^{IQL}$ has expired. If yes, PED drops the next incoming packet. Next, PED checks if $\overline{q}>b_{safe}^{PED}$ AND the timer $\tau_s^{IQL}$ has expired. If yes, PED decreases the packet drop period using the formula for period reductions. PED performs the same checks involving q and $\overline{q}$ upon expiration of the timer $\tau_p$ that controls the periodic update of the packet drop period.

Application to PED for a Third Exemplary Embodiment (Reduction of Packet Drop Period Upon Buffer Overflow)

In a third embodiment, the drop period is halved when the buffer overflows, imposing a minimum time T between updates: if the buffer overflows for a time longer than T, it means that the new traffic mix is faster at increasing the link load and will likely require a higher packet drop rate when it settles.

One exemplary embodiment is implemented in PED with the support of a timer $\tau_p$. When the buffer overflows, PED checks if the timer $\tau_p$ has expired. If yes, the packet drop period is halved and the timer $\tau_p$ is reset. If not, PED leaves the drop period and the timer $\tau_p$ unchanged.

As discussed previously, the exemplary configuration parameters reflect one exemplary embodiment of the present invention. Those skilled in the art would recognize that other parameters and parameter values may be chosen.

Operation

Figure 7A:
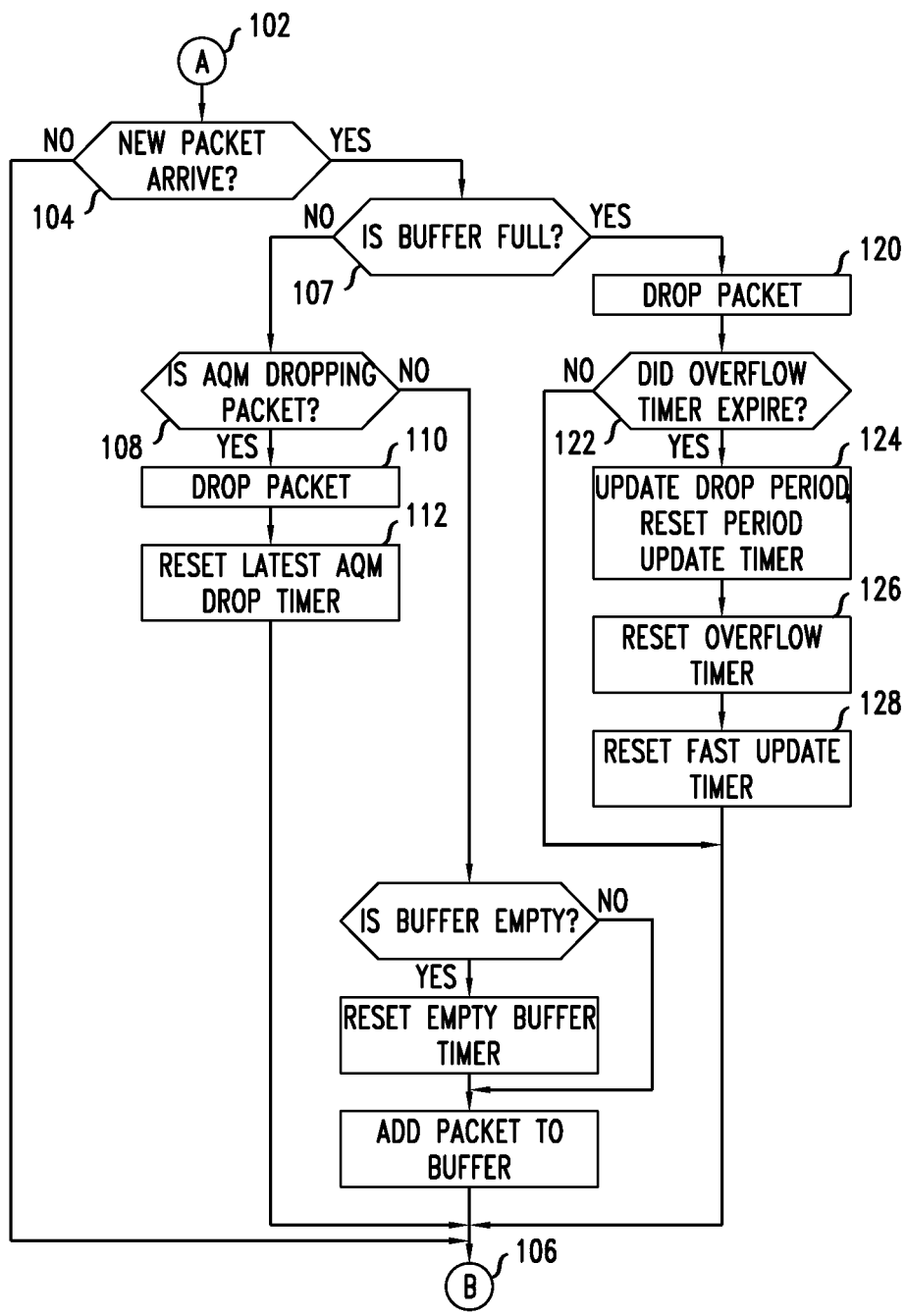
FIGS. 7a, 7b, 7c, 7d and 7e show an exemplary flow diagram for the methodology of the present invention.

Referring now to FIG. 7a, a flow diagram 100 is shown for the implementation of embodiments of the methodology in accordance with the present invention. The flow begins at beginning point A 102. Next, at a first step 104, a decision box is reached and it is determined whether a new packet has arrived. If not the flow proceeds to transition point B 106. If a new packet has arrived, then the flow proceeds to step 107 where it is determined whether the buffer is full. If not another decision box 108 is reached where it is determined whether the AQM is waiting for a packet to drop. If so, a packet is dropped at step 110 and the latest AQM drop timer is reset at step 112. After step 112 the method proceeds to transition point B 106. Returning to decision box 108, if the AQM is not waiting for a packet to drop, then another decision box 114 is reached that determines whether the buffer is empty. If the buffer is empty, then the buffer timer is reset at step 116. At step 118 a packet is added to the buffer and the method proceeds to transition step B 106. If at decision box 107 the buffer is full, then at step 120 a packet is dropped. At decision box 122, it is determined whether the overflow timer has expired. If not, the method proceeds to transition point B 106. If the overflow timer has expired, then the drop period is updated and the period update timer is reset at step 124. The overflow timer at step 126 and the fast update timer at step 128 are also reset. The method then proceeds to transition point B 106.

Figure 7B:
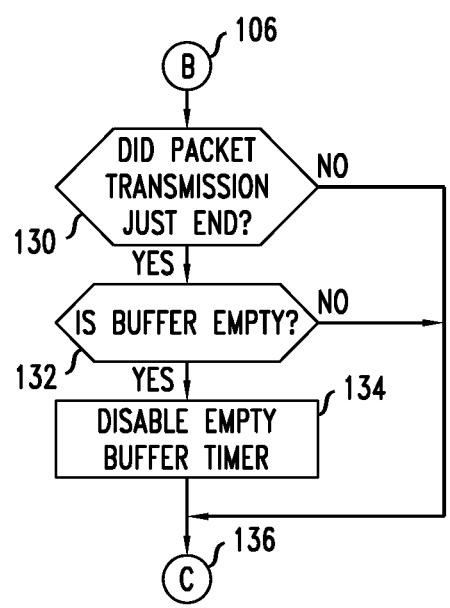

Referring to FIG. 7b, the method begins again at transition point B 106. At this point, the flow diagram proceeds to decision box 130 where it is determined whether the packet transmission has ended. If yes, then at decision box 132, it is determined if the buffer is empty. If so, then the empty buffer timer is disabled at step 134. If at steps 130 and 132, the transmission had ended or the buffer was empty, then the flow proceeds towards transition point C 136.

Figure 7C:
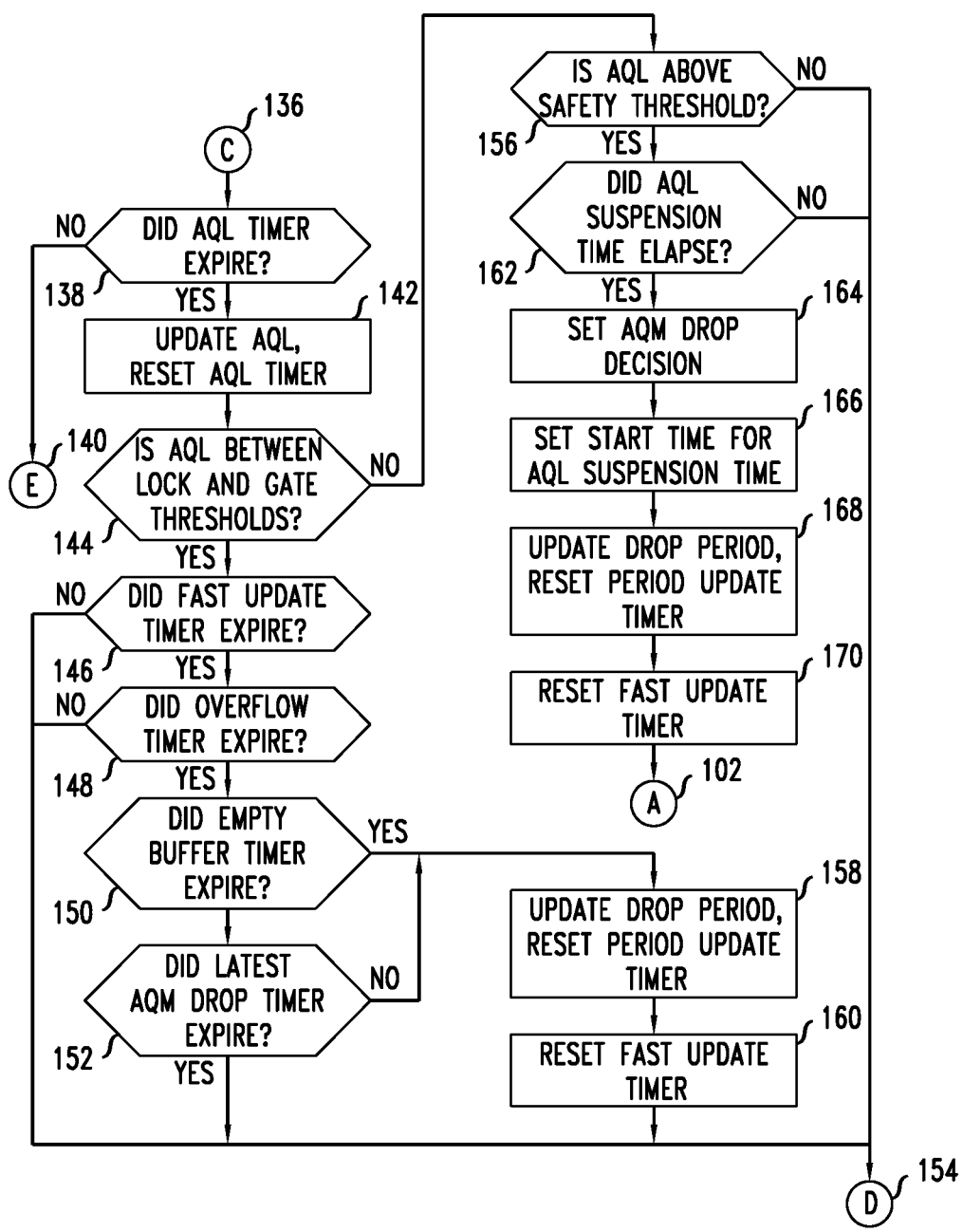

Referring to FIG. 7c, after reaching transition step C 136, the method proceeds to decision box 138 where it is determined whether the AQL timer has expired. If not, the method proceeds to transition step E 140. If the AQL timer has expired, the AQL timer is reset and the AQL value is updated at step 142. Next, at decision box 144 it is determined whether the AQL threshold is between the AQL lock and AQL gate thresholds. If yes, a number of timers are examined to see if they have expired beginning with the fast update timer at decision box 146. Next, the overflow timer is checked for expiration at decision box 148. If yes, it is determined at decision box 150 whether the empty buffer timer has expired. If either the fast update timer or overflow timer has not expired, then the method proceeds toward transition point D 154. If the AQL value is not within the two thresholds, then the method proceeds toward decision box 156.

Returning to decision box 150, if the empty buffer has not expired, then the method proceeds to decision box 152 where it checks if the AQM drop timer has expired. If so, the method proceeds toward transition point D 154. If not, or if the empty buffer timer did expire, then the drop period is updated and the period update timer is reset at step 158. The fast update timer is then also reset at step 160 and the method proceed toward transition point D 154.

At decision box 156 of FIG. 7c it is determined whether the AQL value is above the safety threshold. If so, decision box 162 is reached where it is determined whether the AQL suspension time has elapsed. If not, or if the AQL value was not above the safety threshold, then the method proceeds toward transition point D. If the AQL suspension time has elapsed at step 162, then an AQM drop decision is set at step 164. Next, a start time for AQL suspension time is set at step 166 and the drop period is updated and the period update timer are reset at step 168. Next, the fast update timer is reset at step 170, where following this step, the method proceeds toward beginning transition point A 102.

Figure 7D:
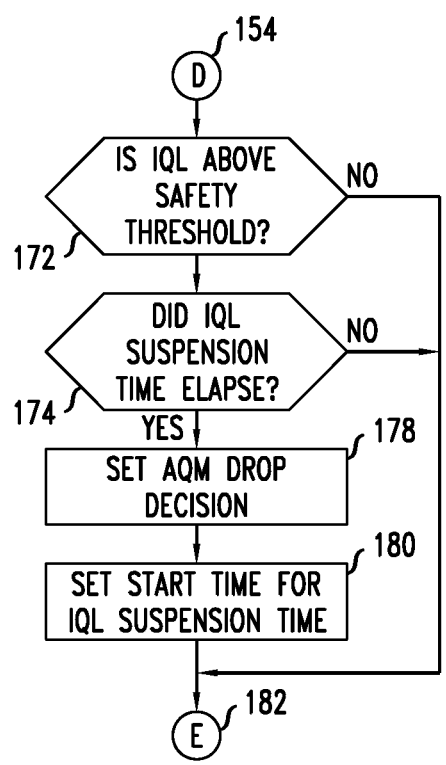

Referring to FIG. 7d, the method reaches transition point D 154. This brings the method to decision box 172 at which it is determined whether the IQL value is above the safety threshold. If so, it is determined whether the IQL suspension time has elapsed. If so, an AQM drop decision is set at step 178 and a start time is set for the IQL suspension time at step 180. Thereafter, transition point E 182 is reached. If the IQL value was not above the safety threshold at step 172 or if the IQL suspension time did not elapse at 174, then the method proceeds toward transition point E 182.

Figure 7E:
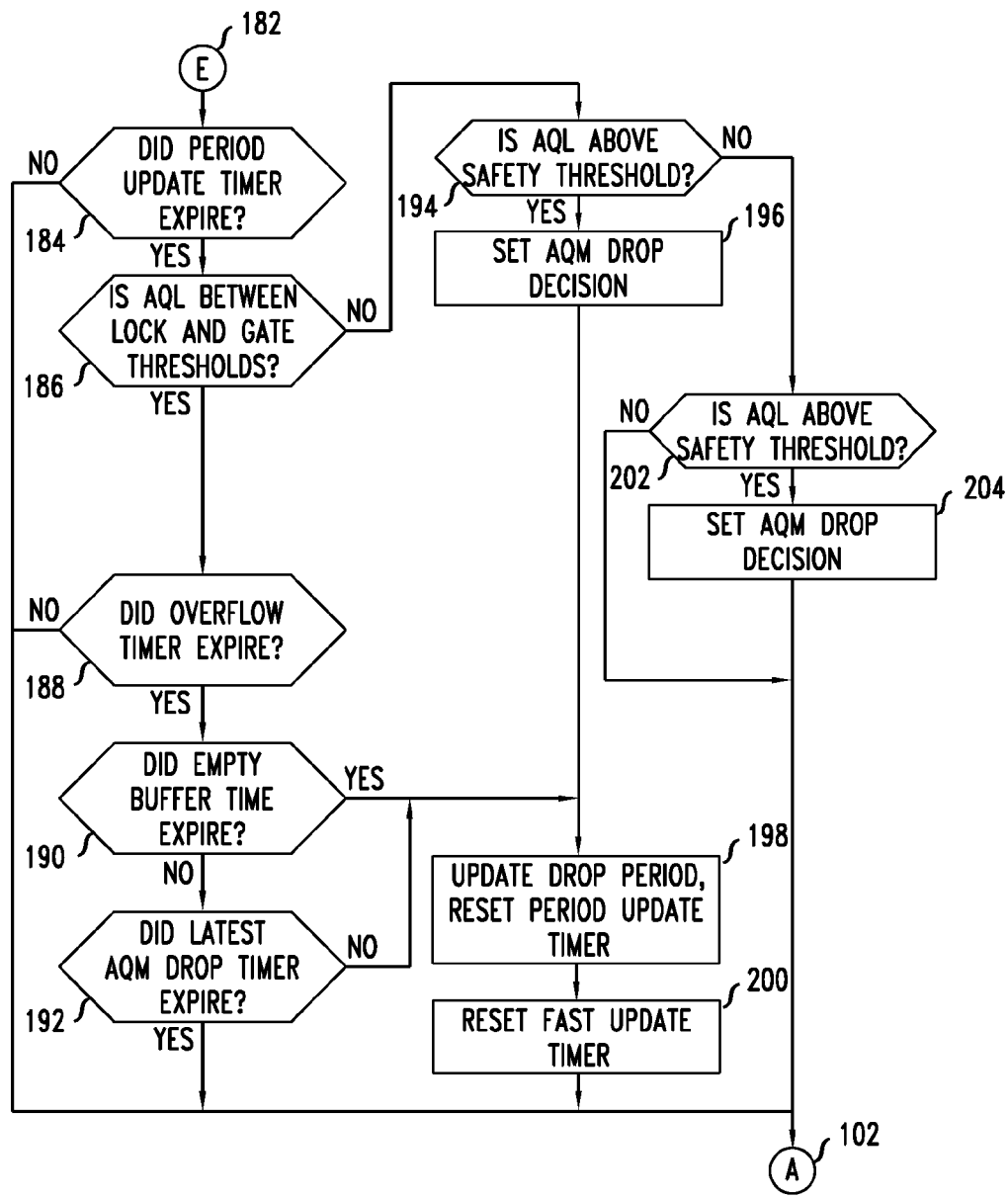

Referring to FIG. 7e, after transition point E 182, a decision box 184 is reached that determines whether the period update timer has expired. If so, another decision box 186 is reached that determines whether the AQL value is between the lock threshold and the gate threshold. If yes, a first of a number of timers, the overflow timer at decision box 188, is checked for expiration. If the period update at step 184 or the overflow timer at step 188 have not expired, the method proceeds to transition point A 102. If the overflow timer at step 188 has expired, then the empty buffer timer is checked for expiration at decision box 190. If not, the method proceeds to a next decision box 192 that determines whether the latest AQM drop timer has expired. If the AQM drop timer has expired, the method proceeds to transition point A 102. If the latest drop timer has not expired or if the empty buffer timer at step 190 has expired, then the method proceeds to step 198.

At step 186, if the AQL value is not between the lock threshold and the gate threshold, then the method proceeds to decision box 194. Here, it is determined whether the AQL value is above the safety threshold. If yes, the method moves to step 196 where the AQM drop decision is set. At next step 198 the drop period is updated and the period update timer is reset. At next step 200, the fast update timer is reset. The method then proceeds to transition point A 102. At decision box 194, if the AQL is not above the safety threshold, a next decision box 202 is reached. Here, it is determined whether the IQL value is above the safety threshold. If yes, the AQM drop decision is set at 204. If no, the method proceeds to transition point A 102.

Figure 8:
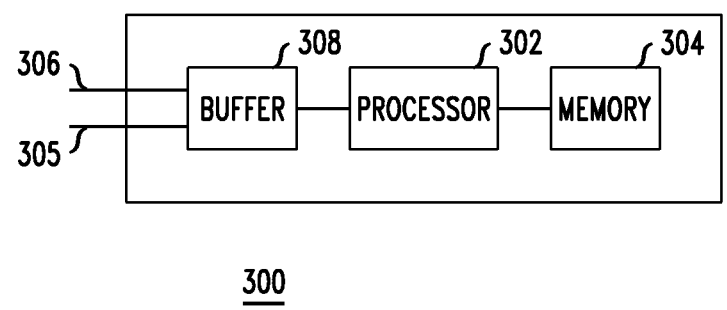
FIG. 8 shows a high level block diagram of an exemplary communications device for implementing the methodology of the present invention.

Referring to FIG. 8, there is shown one exemplary embodiment of a communications node 300 that is capable of implementing the methodology of the present invention. As can be seen, the node 300 includes at least one processor 302 which couples to system memory 304 (e.g., any forms of Random Access Memory (RAM) and Read Only Memory (ROM)). The communications node also includes a plurality of input and output ports 305, 306. One or more memory buffers 308 are utilized to buffer the communications traffic that is received at and transmitted from the communications node 300. As would be understood, the processor executes program code that is stored in memory in order to carry out the prescribed functionality of the communications node. Program code for carrying out the described methodologies of the present invention may be stored in system memory 304 and executed by processor 302.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

What is claimed is:

1. A method of operating a packet buffer, the packet buffer operable to accept multiple flows of packets, wherein an average queue length (AQL) value of said packet buffer is calculated, said method comprising:
- comparing the AQL with a first threshold, wherein a packet drop rate remains unchanged as long as the AQL is less than the first threshold;
- tracking a first timer representative of a time since a latest buffer overflow event, a second timer representative of a time since the buffer was last empty, and a third timer representative of a time since a packet loss was last triggered by an active queue management (AQM) decision; and
- updating the packet drop rate if said AQL is greater than said first threshold and comparison with said first timer indicates that within a given time no buffer overflow has occurred, and comparison with said second timer indicates that within a given time the buffer has not been empty or comparison with said third timer indicates that within a given time there has been at least one packet loss triggered by said AQM decision.

2. The method of claim 1, wherein an instantaneous queue length (IQL) value of said buffer is calculated, further including:
- comparing the IQL with a second threshold; and
- triggering packet losses when the IQL is greater than said second threshold, at time intervals whose duration depends on a distance between said IQL and said second threshold.

3. The method of claim 2, wherein the larger the distance between said IQL and said second threshold, the shorter the time interval.

4. The method of claim 3, wherein an AQM scheme updates parameters that control packet drop decisions at time intervals that depend on the distance between the AQL and said second threshold when the AQL is greater than said second threshold.

5. The method of claim 4, wherein the larger the distance between the AQL and said second threshold, the more frequent the updates.

6. The method of claim 5, wherein the updates are less frequent than extra packet losses controlled by the IQL, but more frequent than the updates of drop-decision parameters triggered by the AQM scheme when the AQL is between a third threshold and said second threshold, wherein said third threshold is an AQL threshold above which the AQM scheme can ordinarily update parameters that control packet drop decisions.

7. The method of claim 1, wherein a drop period is reduced by a given amount when the buffer overflows.

8. The method of claim 7, further including a drop period timer that controls a periodic update of a packet drop period, said drop period timer being checked when said buffer overflows, wherein if said drop period timer has expired, said packet drop period is reduced by said given amount.

9. The method of claim 8, wherein said given amount is one half.

10. A method of operating a packet buffer, the packet buffer operable to accept multiple flows of packets, wherein an average queue length (AQL) value of said packet buffer is calculated, said buffer including an active queue management AQM scheme that includes a drop period, expiration of which triggers a sampling of said AQL, said method comprising:

- providing a first timer, $\tau_u$, that is reset when a packet drop period is updated; a second timer, $\tau_o$, that is reset when the buffer overflows, a third timer, $\tau_e$, that is disabled when the buffer becomes empty and reset when the buffer leaves the empty state and a fourth timer, $\tau_d$, that is reset when the AQM scheme drops a packet;
- upon expiration of a fifth timer $\tau_q$, calculating a new AQL value and comparing said new AQL value to a first threshold, wherein if the AQL exceeds said first threshold, a check is performed to determine if said timer $\tau_u$ and said timer $\tau_o$ are expired and said timer $\tau_e$ is not disabled and the timer $\tau_e$ has expired; and
- updating the packet drop period if said new AQL value is greater than said first threshold and said second timer is expired and said third timer is expired or said fourth timer is not expired.

11. A communications device having memory, said memory having stored therein a plurality of instructions, said device further including a packet buffer, the packet buffer operable to accept multiple flows of packets, wherein an average queue length (AQL) value of said packet buffer is calculated, wherein the plurality of instructions, when executed by a processor, cause the processor to perform the steps of:
- comparing the AQL with a first threshold, wherein a packet drop rate remains unchanged as long as the AQL is less than the first threshold;
- tracking a first timer representative of a time since a latest buffer overflow event, a second timer representative of a time since the buffer was last empty, and a third timer representative of a time since a packet loss was triggered by an active queue management (AQM) decision; and
- updating the packet drop rate if said AQL is greater than said first threshold and comparison with said first timer indicates that within a given time no buffer overflow has occurred, and comparison with said second timer indicates that within a given time the buffer has not been empty or comparison with said third timer indicates that within a given time there has been at least one packet loss triggered by said AQM decision.

12. The device of claim 11, wherein an instantaneous queue length (IQL) value of said buffer is calculated, further including:
- comparing the IQL with a second threshold; and
- triggering packet losses when the IQL is greater than said second threshold, at time intervals whose duration depends on a distance between said IQL and said second threshold.

13. The device of claim 12, wherein the larger the distance between said IQL and said second threshold, the shorter the time interval.

14. The device of claim 13, wherein an AQM scheme updates parameters that control packet drop decisions at time intervals that depend on the distance between the AQL and said second threshold when the AQL is greater than said second threshold.

15. The device of claim 14, wherein the larger the distance between the AQL and said second threshold, the more frequent the updates.

* * * * *